US012183564B2

(12) United States Patent
Bowdler et al.

(10) Patent No.: US 12,183,564 B2
(45) Date of Patent: Dec. 31, 2024

(54) MASS SPECTROMETRY APPARATUS

(71) Applicant: KRATOS ANALYTICAL LIMITED, Manchester (GB)

(72) Inventors: Andrew Bowdler, Manchester (GB); Ian Brookhouse, Manchester (GB); Neil Edmunds, Manchester (GB)

(73) Assignee: KRATOS ANALYTICAL LIMITED, Manchester (GB)

( * ) Notice: Subject to any disclaimer, the term of this patent is extended or adjusted under 35 U.S.C. 154(b) by 561 days.

(21) Appl. No.: 17/437,604

(22) PCT Filed: Feb. 28, 2020

(86) PCT No.: PCT/EP2020/055335
§ 371 (c)(1),
(2) Date: Sep. 9, 2021

(87) PCT Pub. No.: WO2020/182500
PCT Pub. Date: Sep. 17, 2020

(65) Prior Publication Data

US 2022/0157590 A1 May 19, 2022

(30) Foreign Application Priority Data

Mar. 11, 2019 (GB) ..................................... 1903203

(51) Int. Cl.
*H01J 49/16* (2006.01)
*H01J 49/04* (2006.01)
*H01J 49/40* (2006.01)

(52) U.S. Cl.
CPC ........ *H01J 49/164* (2013.01); *H01J 49/0409* (2013.01); *H01J 49/0418* (2013.01); *H01J 49/40* (2013.01)

(58) Field of Classification Search
CPC .. H01J 49/0409; H01J 49/0418; H01J 49/164; H01J 49/40
(Continued)

(56) References Cited

U.S. PATENT DOCUMENTS 6,287,872 B1 9/2001 Schurenberg et al.
6,508,986 B1 * 1/2003 Anderson ................ B01L 9/54 422/65

(Continued)

FOREIGN PATENT DOCUMENTS

DE 197 54 978 C2 7/1999
EP 2 792 471 A1 10/2014

(Continued)

OTHER PUBLICATIONS

Translation of Japanese Office Action dated Jun. 20, 2023 In Application No. 2021-554676.

(Continued)

*Primary Examiner* — Kiet T Nguyen
(74) *Attorney, Agent, or Firm* — Sughrue Mion, PLLC

(57) ABSTRACT

A mass spectrometry apparatus, including a mass spectrometer and a sample plate. The mass spectrometer includes: a sample plate holder configured to hold a sample plate in an engaged position. The mass spectrometer is configured to perform a mass spectrometric analysis of a sample only when the sample is located on a sample plate that is held in the engaged position by the sample plate holder. The mass spectrometer includes one or more engagement features configured to engage with a sample plate so as to prevent the sample plate from being held in the engaged position by the sample plate holder unless the sample plate includes one or more engagement features configured to limit use of the sample plate to a specific analytical technique or a range of analytical techniques to be performed using the mass spec-
(Continued)

trometer. The sample plate is configured for use in the specific analytical technique or range of analytical techniques, wherein the sample plate includes the one or more engagement features configured to limit use of the sample plate to the specific analytical technique or range of analytical techniques.

11 Claims, 11 Drawing Sheets

(58) Field of Classification Search
USPC .......................................................... 250/288
See application file for complete search history.

(56) References Cited

U.S. PATENT DOCUMENTS

| | | | | |
|---|---|---|---|---|
| 6,825,478 | B1 | 11/2004 | McCarthy et al. | |
| 7,282,707 | B1 | 10/2007 | Zanon | |
| 9,214,323 | B1 * | 12/2015 | Vestal | H01J 49/0413 |
| 2007/0075241 | A1 | 4/2007 | Kim | |
| 2009/0285720 | A1 | 11/2009 | Shinoda | |
| 2017/0029587 | A1 | 2/2017 | Naisby et al. | |
| 2019/0006162 | A1 * | 1/2019 | Matsushita | G01N 27/64 |
| 2019/0027352 | A1 | 1/2019 | Toriumi et al. | |

FOREIGN PATENT DOCUMENTS

| | | | |
|---|---|---|---|
| EP | 3 055 420 | B1 | 1/2019 |
| GB | 2 312 782 | A | 11/1997 |
| GB | 2 524 854 | B | 3/2018 |
| JP | 2007-508664 | A | 4/2007 |
| JP | 2009-276199 | A | 11/2009 |
| WO | 2017/085876 | A1 | 5/2017 |

OTHER PUBLICATIONS

Translation of Notice of Rejection dated Oct. 18, 2022 from the Japanese Patent Office in Application No. 2021-554676.
Chinese Office Action dated Aug. 31, 2023 in Chinese Application No. 202080029983.5.
Erin Kaleta, PhD, et al., “Bacterial Identification”, Clinical Laboratory News, May 1, 2012, pp. 1-9.
International Search Report of PCT/EP2020/055335 dated Jun. 9, 2020 [PCT/ISA/210].
Written Opinion of PCT/EP2020/055335 dated Jun. 9, 2020 [PCT/ISA/237].

* cited by examiner

MASS SPECTROMETRY APPARATUS

CROSS REFERENCE TO RELATED APPLICATIONS

This application is a National Stage of International Application No. PCT/EP2020/055335 filed Feb. 28, 2020, claiming priority based on United Kingdom Patent Application No. 1903203.6 filed Mar. 11, 2019.

FIELD OF THE INVENTION

The present invention relates to mass spectrometry apparatuses.

BACKGROUND

Some mass spectrometers can be used to perform multiple different analysis techniques.

For example, a MALDI TOF mass spectrometer may be used for the identification of bacteria and other microorganisms according to various analytical techniques, such as:

- Analysis of intact microorganisms (where bacteria cultured on an Agar gel are applied intact onto the sample plate) whereby mass spectra produced by the mass spectrometer are used for identification of microorganisms by comparing the mass spectra with databases containing mass spectra of peptides and proteins extracted from microorganisms of interest. This is usually carried out using positive ion extraction (where positive ions are extracted from a MALDI plume).
- Analysis of lipids extracted from the cells of microorganisms (where bacteria cultured on an Agar gel are processed to extract characteristic lipids from the cells of the bacteria which are then applied to the sample plate) whereby mass spectra produced by the mass spectrometer are used for identification of microorganisms by comparing the mass spectra with databases containing mass spectra of lipids extracted from microorganisms of interest. This type of analysis is usually carried out using negative ion extraction (where negative ions are extracted from a MALDI plume).

An example of a commercial mass spectrometer which can be used for both of the analytical techniques described above is the Shimadzu AXIMA Assurance™.

A sample plate is a plate used to hold a sample whilst it is in a mass spectrometer. A sample plate is typically held by a sample plate holder which is mounted on a sample stage and is movable in a 2D plane. In a MALDI TOF mass spectrometer, the sample plate and the sample plate holder typically form an electrode of a MALDI ion source of the mass spectrometer.

A MALDI sample is usually provided in the form of a micro-litre sized droplet of dilute aqueous solution that dries into a crystalline spot on a front face of the sample plate. A similar sized drop of a dilute aqueous solution of a UV absorbing matrix is added to the sample on the sample plate. The resulting spot of dried crystalline sample and matrix is typically 1-2 mm across.

As shown in FIG. 1, a sample plate 10 is typically inserted onto a sample stage 11 of a mass spectrometer 12 so that a MALDI sample on a front face of the sample plate 10 can be analysed by the mass spectrometer 12 inside a sample analysis chamber ("SAC") of the mass spectrometer.

In some cases, and as shown in FIG. 1, the sample stage 11 is accessible through a front door 13 of the instrument and the sample plate 10 can be inserted onto the sample stage 11 directly by hand.

In other cases (not shown) the sample plate is inserted into a carrier in a load lock chamber. In such cases the carrier and/or the sample plate is transferred from the load lock chamber onto the sample stage in the sample analysis chamber so that the sample can be analysed by the mass spectrometer.

Currently, a sample plate for a MALDI mass spectrometer or similar instrument is based around a standard layout and design. FIG. 2 shows a standard micro-titer format sample plate.

The standard micro-titer format sample plate is a standard form of sample plate (referred to herein as "standard sample plate") based on the micro-titer plate (also known as the 'microplate') used in many laboratory applications for processing biological samples. The standard sample plate 20 shown in FIG. 2 has an array of 384 sample wells 21 each about 3 mm diameter and arranged in an array of sixteen by twenty-four sample wells 21. The overall dimensions of this form of sample plate are typically 125 mm by 77 mm. The sample plate can be 10 mm thick (like the standard micro-titer plates) or only 2 mm thick (thin plates) for example to save space and/or weight.

It is often more convenient to deal with smaller numbers of samples at one time and or to use a more compact sample plate. A standard form of compact sample plate (referred to herein as "compact sample plate") that is commonly used has 48 wells about 3 mm diameter and an overall size of 76 mm by 26 mm. A commercially available example of this compact sample plate is the FlexiMass™ sample plate 30 shown in FIG. 3. The compact sample plate 30 shown in FIG. 3 has 48 wells 31.

The sample plate holders of larger (typically floor standing) mass spectrometers are typically configured to hold one or more standard sample plates (typically one standard sample plate), whereas the sample plate holders of smaller (typically benchtop) mass spectrometers are typically configured to hold one or more compact sample plates (typically one sample plate).

The larger standard micro-titer sample plates are often used in automated sample handling where samples are processed and deposited on the sample plate by machine. In contrast the (smaller) compact sample plates may be used where the samples are processed and deposited by hand.

An adaptor shaped to have the form of the standard sample plate, but configured to hold one or more compact sample plates can be used to allow one or more compact sample plates to be used in a mass spectrometer whose sample plate holder is configured to hold a standard sample plate.

Sample plates can differ in their construction and may, for example, be machined from solid stainless steel or may be moulded in a conductive plastic and with a metal surface coating 32 in FIG. 3. Such plates can be reusable or disposable depending on the exact method of construction (metal plates are normally reusable, plastic ones are normally disposable). The compact sample plate made from plastic is particularly useful for mass production. Sample plates can also differ in the use of special coatings on a front face that control the way the sample is deposited and located on the sample plate.

Some sample plates are configured for use in a specific analytical technique to be performed using a mass spectrometer, e.g. by having a particular coating, particular dimensions, a particular layout and/or other features configured for use in the specific application in question. For example by using a combination of hydrophilic and/or hydrophobic coatings, the sample can be confined to a small area on the sample plate which can enhance accuracy of location and sensitivity, see for example DE19754978C [1] and U.S. Pat. No. 6,287,872B [2].

Coatings on the surface of the sample plate can also enhance the detection of specific types of sample in the mass spectrometer. For example, a sample plate for use in the "Analysis of intact microorganisms" technique (discussed above) typically has a hydrophobic coating formed from small molecules such as lipids which is required in order to obtain a useful result, see for example EP2792471 B1 [3] and US2017029587A1 [4]. However, whilst this coating is in practice essential for the "Analysis of intact microorganisms" technique (discussed above), it can be a significant problem for the "Analysis of lipids extracted from the cells of microorganisms technique" (see for example GB2524854B [5] and EP3055420B1 [6]) where the hydrophobic coating of small molecules such as lipids can cause unwanted peaks that interfere with the sample peaks and would thus obstruct or even prevent a useful result from being obtained. This is illustrated in FIG. 12 where the negative ion MALDI-TOF MS spectrum includes a sample peak 150 (at m/z=747.6) and has nearby peaks 151 and 152 that originate from the lipid coating on the sample plate. Clearly, it is preferable that only the lipid sample peak 150 appears in the mass spectrum and the lipid coating peaks 151 and 152 from the sample plate are absent from the mass spectrum.

For some analytical techniques, e.g. "Analysis of intact microorganisms", a mass spectrometer may be used in a regulated environment (such as in-vitro diagnostics) where only a specific type or class of sample is measured in the mass spectrometer and the results are used in a medical diagnosis (for example Biomerieux Vitek®MS instrument and Kaleta and Wolk, Clin Lab News; May 2012 [7]). The sample plates used for such an application are typically compact sample plates (having the 48 well format discussed above). These can be analysed one at a time in for example a benchtop instrument and can also be analysed in a larger instrument, e.g. by holding multiple sample plates together in an adaptor as described above.

The compact sample plates are also more suitable to being made from plastic and to be disposable. In a regulated environment it is important to use a new sample plate for each measurement. This prevents contamination by samples from previous measurements even after the sample plate has been cleaned.

Where the sample plate is used in a regulated environment for a specific application (e.g. microbial ID by the intact microorganism technique) and the sample plate includes features essential to the measurement of the regulated sample according to that specific application, it is desirable to ensure that only the correct type of sample plate can be used in the mass spectrometer, i.e. to use only those sample plates configured for the specific application.

The present inventors have observed that currently, with standard sample plates and compact sample plates, any sample plate with the same physical outline can be used in an instrument. It is therefore not possible to prevent sample plates configured for use in different applications from being used in a given mass spectrometer. Thus it is possible that a reusable sample plate or a plate without the required surface coating could be used in an instrument in a regulated environment where only a particular type of sample plate including that coating should be used, which could in turn lead to an incorrect result and possible misdiagnosis.

The present invention has been devised in light of the above considerations.

SUMMARY OF THE INVENTION

The invention includes the combination of the aspects and preferred features described except where such a combination is clearly impermissible or expressly avoided.

A first aspect of the present invention provides:

A mass spectrometry apparatus, including:

a mass spectrometer including:

a sample plate holder configured to hold a sample plate in an engaged position;

wherein the mass spectrometer is configured to perform a mass spectrometric analysis of a sample only when the sample is located on a sample plate that is held in the engaged position by the sample plate holder;

wherein the mass spectrometer includes one or more engagement features configured to engage with a sample plate so as to prevent the sample plate from being held in the engaged position by the sample plate holder unless the sample plate includes one or more engagement features configured to limit use of the sample plate to a specific analytical technique or a range of analytical techniques to be performed using the mass spectrometer;

a sample plate configured for use in the specific analytical technique or range of analytical techniques, wherein the sample plate includes the one or more engagement features configured to limit use of the sample plate to the specific analytical technique or range of analytical techniques.

In this way, the one or more engagement features of the mass spectrometer and the one or more engagement features on the sample plate serve to "lock down" the mass spectrometer for use only with sample plates configured for use in the specific analytical technique or range of analytical techniques to be performed using the mass spectrometer.

Thus, a user can be prevented from using the mass spectrometer with a sample plate that is not configured for use in the specific analytical technique or range of analytical techniques to be performed using the mass spectrometer.

This may be useful where the mass spectrometer is in an environment in which the mass spectrometer is only intended to be used in performing the specific analytical technique or range of analytical techniques (i.e. not other analytical techniques), since it ensures that only sample plates configured for use in that analytical technique or range of analytical techniques are used, thereby helping to avoid use of a sample plate not configured for use in the specific analytical technique or range of analytical techniques (which, if used in that specific analytical technique or range of analytical techniques, could cause erroneous results).

For example, in a lab in which the mass spectrometer is required and/or configured to be used in performing microbial ID by the intact microorganism technique, it is possible to ensure only sample plates configured for use in microbial ID by the intact microorganism technique are used.

For the purpose of this disclosure, a "specific analytical technique or range of analytical techniques to be performed by the mass spectrometer" in relation to a given mass spectrometer may be understood as an analytical technique or range of analytical techniques that can be performed using the mass spectrometer, wherein the specific analytical technique or range of analytical techniques requires use of a sample plate configured in a particular way in order for a useful result to be obtained.

In some cases, the specific analytical technique or range of analytical techniques might be only a subset of the analytical techniques that could potentially be performed using the mass spectrometer (i.e. such that there are other analytical techniques could be performed by the mass spectrometer), though this is not a requirement of the invention since the mass spectrometer may itself be configured for use only in the specific analytical technique or range of analytical techniques (see below).

Preferably, the mass spectrometer is configured for use only in the specific analytical technique or range of analytical techniques, e.g. by having hardware and/or software features intended to limit use of the mass spectrometer to the specific analytical technique or range of analytical techniques.

The mass spectrometer could be configured for use only in the specific analytical technique or range of analytical techniques in different ways. For example, software via which the user controls the mass spectrometer may be configured so that only the specific analytical technique or range of analytical techniques can be performed using the mass spectrometer.

Alternatively, the mass spectrometer can be configured for use only in the specific analytical technique or range of analytical techniques by configuring the hardware of the mass spectrometer so that the mass spectrometer is only able to perform the specific analytical technique or range of analytical techniques.

For example, the mass spectrometer can be limited for use only in those analytical techniques that use positive ion extraction by including only high-voltage power supplies suitable for positive ions and/or omitting to use high voltage power supplies required for negative ions. Note that the mass spectrometer need not be required to be configured for use only in the specific analytical technique or range of analytical techniques in all examples of the invention, e.g. where the mass spectrometer is in a regulated environment in which only a specific analytical technique is intended to be performed using the mass spectrometer.

Preferably the one or more engagement features configured to limit use of the sample plate to the specific analytical technique or range of analytical techniques uniquely correspond to the specific analytical technique or range of analytical techniques, i.e. should only be included on sample plates configured for use in the specific analytical technique or range of analytical techniques, and should be absent from sample plates not configured for use in the specific analytical technique or range of analytical techniques (e.g. in other mass spectrometers made by the same manufacturer).

Preferably, the one or more engagement features of the mass spectrometer are configured to physically engage with (i.e. directly contact) the one or more engagement features of the sample plate (as in examples 1-7 discussed below) so as to prevent the sample plate from being held in the engaged position by the sample plate holder unless the sample plate includes one or more engagement features configured to limit use of the sample plate to a specific analytical technique or a range of analytical techniques to be performed using the mass spectrometer.

Engagement features may thus be referred to as physical engagement features herein.

For completeness, we note that the standard micro-titer sample plate used for processing biological samples (as discussed above) includes two chamfered corners which could potentially be viewed as engagement features. However these chamfered corners are intended and configured only to ensure that the micro-titer sample plate is inserted in the correct orientation, rather than to limit use of the standard micro-titer sample plate to a specific analytical technique or range of analytical techniques to be performed by a given mass spectrometer. Thus, the two chamfered corners included in the standard micro-titer thus appear on sample plates configured for use in various types of mass spectrometer and various analytical techniques to be performed by mass spectrometers, and therefore do not limit use of such a sample plate to a specific analytical technique or a range of analytical techniques to be performed using a given mass spectrometer.

The sample plate may be configured to hold one or more samples.

The sample plate may be configured for use in the specific analytical technique or range of analytical techniques by having one or more features that are required in order for a useful result to be obtained when using the mass spectrometer to perform that specific application.

For example, the sample plate may be configured for use in the specific analytical technique or range of analytical techniques by:

- having a particular coating required by the specific application of the mass spectrometer applied to a front face of the sample plate, wherein the front face of the sample plate is configured to have a sample located thereon when the sample plate is in use.

For example, the sample plate may be configured for use in the specific analytical technique or range of analytical techniques by:

- not having a particular coating required by a different specific application of the mass spectrometer applied to a front face of the sample plate, wherein the front face of the sample plate is configured to have a sample located thereon when the sample plate is in use.

For example, the sample plate may be configured for use in the specific analytical technique or range of analytical techniques by:

- the plate being made of or otherwise including one or more materials required by the specific application of the mass spectrometer.

For example, the sample plate may be configured for use in the specific analytical technique or range of analytical techniques by:

- having one or more physical features required by the specific application of the mass spectrometer.

By way of example, if the mass spectrometer is a MALDI-TOF mass spectrometer, the specific analytical technique or range of analytical techniques could be:

- Analysis of intact microorganisms: This technique requires a sample plate having a lipid coating applied to a sample surface of the sample plate in order for a useful result to be obtained, and is usually carried out using positive ion extraction [3], [4], [7].
- Analysis of lipids extracted from the cells of microorganisms: This technique requires negative ion extraction (extraction of negative ions rather than positive ions from the plume of ions resulting from the MALDI process). Crucially, it works by the detection of lipids characteristic of the microorganism and therefore in order for a useful result to be obtained it is important to use a sample plate not having a coating which can interfere with the lipid sample spectra applied to a sample surface of the sample plate [5], [6].

Preferably, the one or more engagement features of a first one of the mass spectrometer and the sample plate include one or more projections, and the one or more engagement features of a second one of the mass spectrometer and the sample plate include one or more recesses corresponding to the one or more projections (e.g. such that the one or more projections fit into the one or more recesses).

Put another way, this means that preferably:

- the one or more engagement features of the mass spectrometer include one or more projections, and the one or more engagement features of the sample plate include one or more recesses corresponding to the one or more projections (e.g. such that the one or more projections fit into the one or more recesses); or
- the one or more engagement features of the sample plate include one or more projections, and the one or more engagement features of the mass spectrometer include one or more recesses corresponding to the one or more projections (e.g. such that the one or more projections fit into the one or more recesses).

Multiple projections and multiple recesses may be preferred, e.g. to help ensure that the sample plate is prevented from being held in the engaged position by the sample plate holder unless the sample plate includes one or more engagement features configured to limit use of the sample plate to a specific application of the mass spectrometer. Multiple projections and multiple recesses may be useful to ensure that the one or more engagement features configured to limit use of the sample plate to the specific analytical technique or range of analytical techniques uniquely correspond to the specific analytical technique or range of analytical techniques.

Preferably:

- the one or more engagement features of the mass spectrometer include one or more projections, and the one or more engagement features of the sample plate include one or more recesses corresponding to the one or more projections (e.g. such that the one or more projections fit into the one or more recesses).

In this case, the one or more projections of the mass spectrometer may, for example, be configured to fit into the one or more recesses of the sample plate when the sample plate that is held in the engaged position by the sample plate holder (e.g. as in example 1 and example 2, discussed below), and/or the one or more projections of the mass spectrometer may be configured to fit into the one or more recesses of the sample plate when the sample plate is being pushed (e.g. through a slot) into a position in which the sample plate is held in the engaged position by the sample plate holder (e.g. as in example 3, discussed below).

Preferably, the one or more engagement features of the sample plate are located on a rear face of the sample plate, wherein the rear face of the sample plate is on an opposite side of the sample plate from a front face of the sample plate, wherein the front face of the sample plate is configured to have a sample located thereon when the sample plate is in use.

By locating the one or more engagement features of the sample plate on rear face of the/each sample plate, the influence of the one or more engagement features on an mass spectrometric analysis performed using the sample plate can be minimised, e.g. so as to avoid voltage breakdown that may be caused by imperfections on the front face.

The one or more recesses, if included in the sample plate, may extend entirely through the sample plate (e.g. may be slots as in example 1, discussed below) or may extend partially into the sample plate (e.g. as in example 2 and example 3, discussed below).

Having one or more recesses which extend partially into a rear face of the sample plate is one particularly preferred arrangement which helps to minimise the influence of the one or more engagement features on a mass spectrometric analysis performed using the sample plate.

Preferably, the one or more engagement features of the mass spectrometer are located on the sample plate holder.

However, it is also possible for the one or more engagement features of the mass spectrometer to be located somewhere other than the sample plate holder. For example, the one or more engagement features of the mass spectrometer could be part of the mass spectrometer defining a slot into which the sample plate needs to be inserted in order to be held in the engaged position by the sample plate holder.

In this example, the one or more engagement features of the mass spectrometer could (e.g. include one or more appropriately located projections configured to) prevent the sample plate from being inserted into the slot unless the sample plate includes the one or more engagement features configured to limit use of the sample plate to the specific analytical technique or range of analytical techniques. By way of example, the one or more engagement features included on the sample plate could e.g. be one or more recesses corresponding to one or more projections which form the one or more engagement features of the mass spectrometer.

The mass spectrometer could be configured to perform a mass spectrometric analysis of a sample only when the sample is located on a sample plate that is held in the engaged position by the sample plate holder by, for example:

- the mass spectrometer having a slot into which the sample plate needs to be fully inserted in order to be held in the engaged position by the sample plate holder;
- the one or more engagement features of the mass spectrometer being configured to prevent a sample plate from being inserted fully into the mass spectrometer unless the sample plate includes the one or more engagement features configured to limit use of the sample plate to a specific application of the mass spectrometer;
- the mass spectrometer being configured to perform a mass spectrometric analysis of a sample only when a door of the mass spectrometer is closed, wherein the door is configured not to close if a sample plate is only partially, and not fully, inserted into the slot.

The mass spectrometer could be configured to perform a mass spectrometric analysis of a sample only when the sample is located on a sample plate that is held in the engaged position by the sample plate holder by, for example:

- the mass spectrometer having a sample plate position sensor configured to be used to detect if a sample plate is held in the engaged position by the sample plate holder;
- wherein the mass spectrometer is configured to perform a mass spectrometric analysis of a sample only when (e.g. a control unit of) the mass spectrometer determines, based on an output of the sample plate position sensor, that a sample plate is held in the engaged position by the sample plate holder.

The sample plate position sensor could, for example, be an optical sensor, configured to be used to detect whether any objects are present outside an expected profile of the sample plate when a sample plate is held in the engaged position by the sample plate holder.

The mass spectrometer may have an engagement feature sensor configured to be used to detect whether a sample plate put in the mass spectrometer has the one or more engagement features configured to limit use of the sample plate to a specific analytical technique, wherein the mass spectrometer is configured to perform a mass spectrometric analysis of a sample only when (e.g. a control unit of) the mass spectrometer determines, based on an output of the engagement feature sensor, that the sample plate put in the mass spectrometer includes the one or more engagement features configured to limit use of the sample plate to a specific analytical technique.

In this way, the mass spectrometer could be able to prevent use of sample plates lacking the required engagement features (configured to limit use of the sample plate to a specific analytical technique), even if a user removed the one or more engagement features of the mass spectrometer in an attempt to enable such sample plates to be held in the engaged position by the sample plate holder. In other words, the engagement feature sensor helps to provide a second level of security that would only be needed if a user tries to circumvent the first level of security provided by the previously described engagement features.

For the avoidance of any doubt, the engagement feature sensor could be configured to detect whether a sample plate put in the mass spectrometer has the one or more engagement features (configured to limit use of the sample plate to a specific analytical technique) when the sample plate is held in the engaged position or before the sample plate is held in the engaged position.

The engagement feature sensor could be an optical sensor, e.g. configured to be used to detect whether a sample plate put in the mass spectrometer has the one or more engagement features configured to limit use of the sample plate to a specific analytical technique. Other types of sensor are of course possible.

For the avoidance of any doubt, the sample plate position sensor and the engagement feature sensor could be provided by the same sensor, which may conveniently be an optical sensor.

An above-mentioned optical sensor may be an imaging sensor, e.g. for producing an optical image. Such sensors are well known. The imaging sensor could be a camera configured to be used to view samples held on the sample plate.

In some examples, the one or more engagement features of the mass spectrometer may include a hinged plate included in the sample plate holder, wherein the hinged plate is configured to prevent the sample plate from being held in the engaged position by the sample plate holder unless the sample plate includes the one or more engagement features configured to limit use of the sample plate to a specific application of the mass spectrometer (e.g. as in example 4, discussed below).

In some examples, the one or more engagement features of the mass spectrometer may include a latch mechanism included in the sample plate holder, and the one or more engagement features of the sample plate may include one or more magnets or magnetic areas (preferably multiple magnets or magnetic areas), the/each magnet or magnetic area being respectively located in a specific position on or within the sample plate, wherein the latch mechanism is configured to prevent the sample plate from being held in the engaged position by the sample plate holder unless the sample plate includes the one or more magnets or magnetic areas located in the specific position(s), the magnet(s) or magnetic area(s) being configured to move (e.g. slide) a member (e.g. plate) of the latch mechanism to allow the sample plate to reach the engaged position (e.g. as in example 5, discussed below).

The mass spectrometry apparatus may include multiple sample plates configured for use in the specific analytical technique or range of analytical techniques, wherein each sample plate includes the one or more engagement features configured to limit use of the sample plate to the specific analytical technique or range of analytical techniques.

In some examples which may be referred to herein as non-adaptor-based examples, the sample plate holder may be an integral part of the mass spectrometer.

In a set of examples which may be referred to herein as adaptor-based examples, the sample plate holder referred to above may be a sample plate holder adaptor configured to be held in an engaged position by another sample plate holder of the mass spectrometer.

Thus, in adaptor-based examples, the mass spectrometer may have a first sample plate holder configured to hold a first form of sample plate (e.g. a standard sample plate as discussed above), and the sample plate adaptor is a second sample plate holder that is both configured to be held by the first sample plate holder (e.g. by being shaped to have the first form of sample plate) and configured to hold a second form of sample plate (e.g. a compact sample plate as discussed above).

In adaptor-based examples, features described previously with reference to the "sample plate holder" may apply to the second sample plate holder, i.e. the sample plate adaptor.

In adaptor-based examples, the first sample plate holder may be configured to hold a sample plate adaptor in an engaged position, wherein the mass spectrometer includes one or more engagement features configured to engage with the sample plate adaptor so as to prevent the sample plate adaptor from being held in the engaged position by the first sample plate holder unless the sample plate adaptor includes one or more engagement features that are included on the sample plate adaptor. In this way, the mass spectrometer can be "locked down" to prevent other forms of sample plate adaptors being used with the mass spectrometer. However, it would also be possible to "lock down" the mass spectrometer for use only with sample plates configured for use in the specific analytical technique or range of analytical techniques using an adaptor having a standard form into a mass spectrometer that, were it not for use of the adaptor, would not be "locked down" to prevent other forms of sample plate adaptors being used with the mass spectrometer.

The mass spectrometer may be a MALDI TOF mass spectrometer.

A typical MALDI TOF mass spectrometry apparatus may include:

- a sample stage, preferably configured to move in a 2D plane, wherein the 2D plane is preferably perpendicular to an extraction axis;
- a sample plate holder which sits on the stage and is configured to hold a sample plate and which forms at least part of a first electrode of the instrument.

The sample plate may be configured for use in a MALDI TOF mass spectrometer. Such a sample plate may have a conductive face on which the sample sits (the whole plate is normally conductive) and is electrically connected to the sample plate holder.

A laser of the MALDI TOF mass spectrometer may be configured to ionise a sample held by the sample plate, and the MALDI TOF mass spectrometer may be configured to extract ions produced by ionisation of the sample into a TOF analyser, e.g. according to known techniques. The sample plate may be held directly by the sample plate holder, or indirectly via an adaptor.

The MALDI TOF mass spectrometer may be configured to extract positive ions produced by ionisation of the sample into the TOF analyser ('positive ion extraction').

The MALDI TOF mass spectrometer may be configured to extract negative ions produced by ionisation of the sample into the TOF analyser ('negative ion extraction').

As noted above, the MALDI TOF mass spectrometer may include hardware and/or software features which limit its use to just one of positive ion extraction or negative ion extraction, or it may be configured to allow a user to select between the positive ion extraction and negative ion extraction.

The mass spectrometer may include a reflectron (ion mirror). A reflectron may be useful so that the mass spectrometer can measure tandem time-of-flight mass spectra. Such a mass spectrometer can measure mass spectra for fragments of ions by meta-stable decay or collision induced dissociation. A linear only mass spectrometer without a reflectron cannot be used to produce mass spectra for fragment ions.

The mass spectrometry apparatus may include one or more sample plates configured for use in another specific analytical technique or range of analytical techniques to be performed by a mass spectrometer, wherein each sample plate configured for use in the other specific analytical technique or range of analytical techniques includes one or more engagement features configured to limit use of the sample plate to the other analytical technique or range of analytical techniques.

In this case, the one or more engagement features of the mass spectrometer (configured to engage with a sample plate so as to prevent the sample plate from being held in the engaged position by the sample plate holder unless the sample plate includes one or more engagement features configured to limit use of the sample plate to the specific analytical technique or range of analytical techniques) should be configured to prevent a sample plate configured for use in the other specific analytical technique or range of analytical techniques from being held in the engaged position by the sample plate holder.

There may be provided another mass spectrometer included in the mass spectrometry apparatus, the other mass spectrometer including:

- a sample plate holder configured to hold a sample plate in an engaged position;
- wherein the mass spectrometer is configured to perform a mass spectrometric analysis of a sample only when the sample is located on a sample plate that is held in the engaged position by the sample plate holder;
- wherein the mass spectrometer includes one or more engagement features configured to engage with a sample plate so as to prevent the sample plate from being held in the engaged position by the sample plate holder unless the sample plate includes one or more engagement features configured to limit use of the sample plate to the other specific analytical technique or range of analytical techniques.

A second aspect of the invention may provide a mass spectrometer as set out in the first aspect of the invention. The mass spectrometer may be configured for use with a sample plate as set out in the first aspect of the invention. The mass spectrometer may be configured for use in a mass spectrometry apparatus as set out in the first aspect of the invention.

A third aspect of the invention may provide a sample plate or multiple sample plates as set out in the first aspect of the invention. The sample plate(s) may be configured for use with a mass spectrometer as set out in the first aspect of the invention. The sample plate(s) may be configured for use in a mass spectrometry apparatus as set out in the first aspect of the invention.

A fourth aspect of the invention may provide a mass spectrometry apparatus according to the first aspect of the invention, a mass spectrometer according to the second aspect of the invention, and/or one or more sample plates according to the third aspect of the invention, except that the/each sample plate is not required to be configured for use in a specific analytical technique or range of analytical techniques, and the one or more engagement features included in the/each sample plate are not required to be configured to limit use of the sample plate to the specific analytical technique or a range of analytical techniques. Thus, a mass spectrometry apparatus, a mass spectrometer and/or one or more sample plates according to the fourth aspect of the invention may be as described in relation to the first, second and third aspects of the invention, except that the one or more engagement features included in the/each sample plate could be used to "lock down" a mass spectrometer for a purpose other than ensuring that sample plates configured for use in a specific analytical technique or range of analytical techniques are used in the mass spectrometer. By way of example, the one or more engagement features could instead be configured to "lock down" a mass spectrometer for use only with proprietary sample plates made by a particular entity (e.g. so as to stop sample plates made by other manufacturers being used with the mass spectrometer). To obtain a more detailed statement of invention describing the fourth aspect of the invention, the first, second and/or third aspects of the invention may be amended to remove the requirement that the/each sample plate is configured for use in a specific analytical technique or range of analytical techniques, and to remove the requirement that the one or more engagement features included in the/each sample plate are configured to limit use of the sample plate to a specific analytical technique or a range of analytical techniques (and similarly to remove/update any features dependent on the sample plates being configured in this way).

The invention includes the combination of the aspects and preferred features described except where such a combination is clearly impermissible or expressly avoided.

SUMMARY OF THE FIGURES

Examples and experiments illustrating the principles of the invention will now be discussed with reference to the accompanying figures in which:

FIG. 4(*b*) shows the compact sample plate of FIG. 4(*a*) and a sample plate holder configured to engage with the compact sample plate, where the compact sample plate is in held in an engaged position by the sample plate holder.

FIG. 6(*b*) shows the compact sample plate of FIG. 6(*a*) and sample plate holder configured to engage with the compact sample plate, where the compact sample plate is in held in an engaged position by the sample plate holder. In this figure, the sample plate holder is drawn semi-transparently so that the engagement features can be seen.

FIG. 7(*b*) shows the compact sample plate of FIG. 7(*a*) and a sample plate holder configured to engage with the compact sample plate. In this figure, the compact sample plate is drawn semi-transparently so that the engagement features can be seen.

FIG. 8(*b*) shows the compact sample plate of FIG. 8(*a*) and a hinged plate configured to engage with the compact sample plate. As shown, a portion of the compact sample plate has been cut-away so that the hinged plate and projections thereon can more clearly be seen.

FIG. 8(*c*) shows a view of the underside of a compact sample plate and hinged plate as shown in FIG. 8(*b*).

FIG. 9(*b*) shows the front of the compact sample plate of FIG. 9(*a*) as well as a magnetic latch according to example 5.

FIG. 10(*b*) shows the standard sample plate and a sample plate holder configured to engage with the standard sample plate.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

The following examples concern sample plates for use in mass spectrometers and more preferably, for use in MALDI TOF mass spectrometers.

In the following description, various sample plates are described for use for example in a MALDI TOF mass spectrometer whereby one or more engagement features, e.g. in the form of a mechanical key, are incorporated into the sample plate to limit use of the sample plate to the specific analytical technique or range of analytical techniques, which may for example help to ensure that only a certain type of sample plate can be used for a specific type of sample. Thus in a regulated environment, the one or more engagement features may help to prevent the wrong sample plate from being used for the wrong analytical technique. For example with an analytical technique involved with in vitro diagnostics a misdiagnosis due to using the incorrect type of sample plate may be avoided.

Thus, a mass spectrometer can be locked down for use with a particular type of sample plate to be used in a particular analytical technique corresponding to the environment (e.g. lab) in which it is installed.

Preferably, the one or more engagement features included in a sample plate (e.g. to provide the sample plate with a mechanical 'key') are configured so that the sample plate will only fit into a mass spectrometer with one or more corresponding engagement features (e.g. the correct 'lock'). Sample plates configured for use in different analytical techniques can thus have different engagement features, e.g. so as to restrict use of different sample plates to different analytical techniques. The one or more engagement features on a sample plate can be designed so that the sample plate does not fit correctly into the sample plate holder. Preferably the mass spectrometer is configured so that it does not operate if the sample plate does not fit correctly in the sample plate holder. For example, the mass spectrometer may be configured so that a door of the instrument will not close unless the sample plate fits correctly in the sample plate holder. Alternatively, the one or more engagement features on the sample plate can be designed so that the instrument can recognise when the wrong sample plate is fitted and will not operate until a correctly fitting sample plate is present.

EXAMPLES

Example 1

Figure 1:
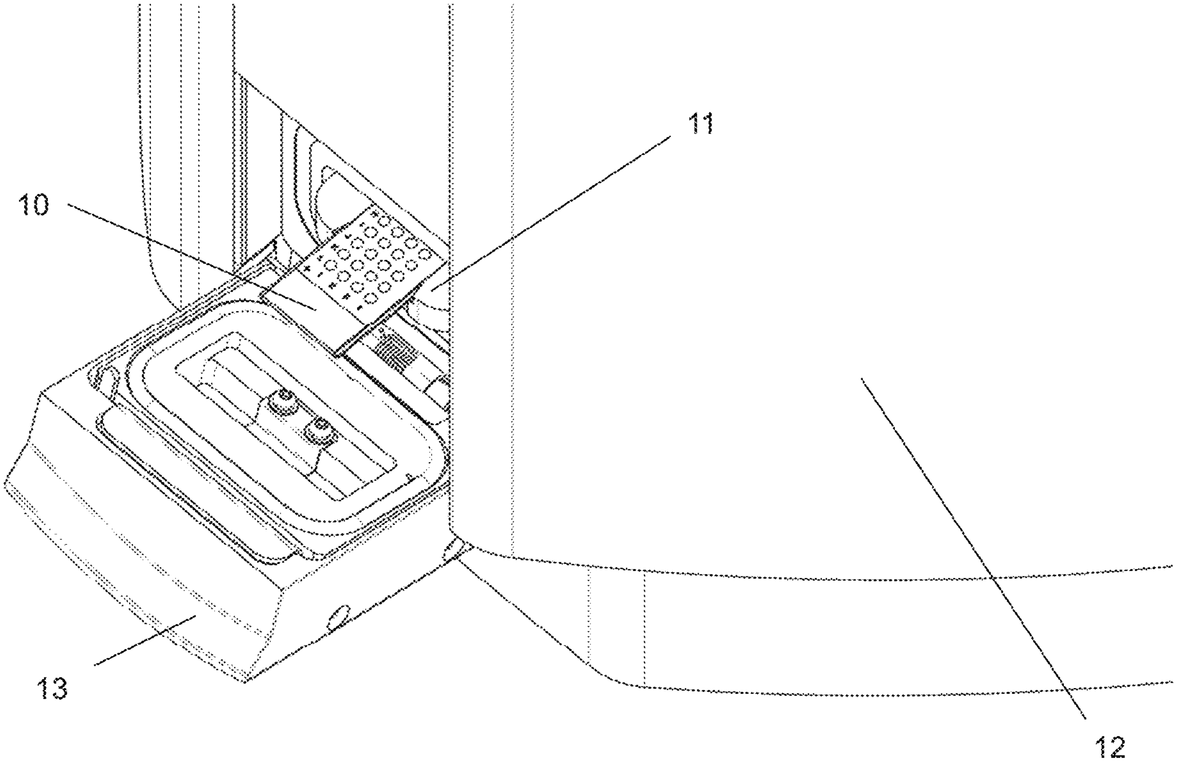
FIG. 1 shows the method of insertion of a compact sample plate into the sample plate holder of a benchtop mass spectrometer.
Figure 2:
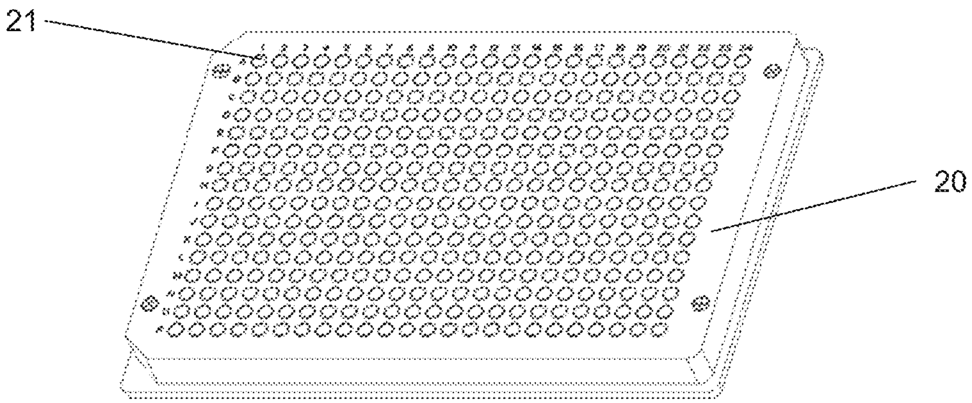
FIG. 2 shows a standard sample plate with 384 sample locations.
Figure 3:
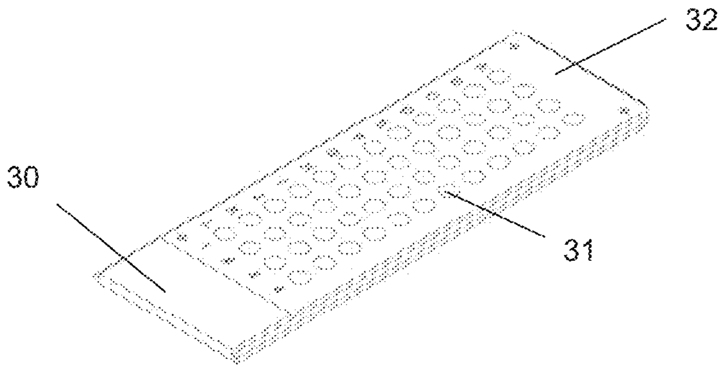
FIG. 3 shows a compact sample plate with 48 sample locations.
Figure 4A:
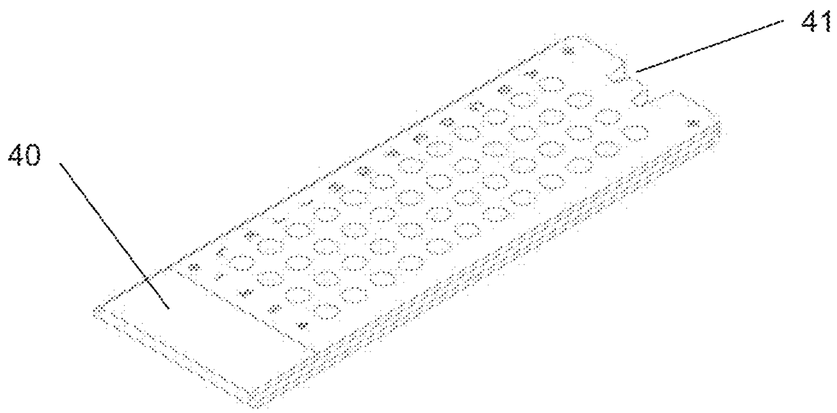
FIG. 4(*a*) shows a compact sample plate according to example 1.
Figure 4B:
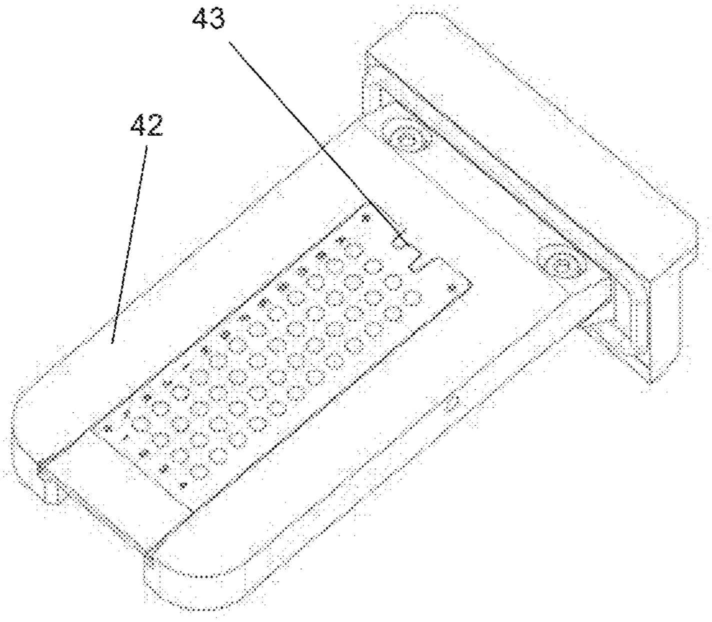

In this example, as shown in FIGS. 4(*a*) and 4(*b*), a sample plate 40 has engagement features in the form of slots which provide a shaped cut-out 41 in an end of the sample plate 40 (the end which is configured to be inserted into the sample plate holder of the mass spectrometer). These engagement features are configured to limit use of the sample plate to (and preferably uniquely correspond to) a specific analytical technique or range of analytical techniques, e.g. 'Analysis of intact microorganisms' or 'Analysis of lipids extracted from the cells of microorganisms' as described above.

The slots which provide the cut-out 41 may have a square cornered profile or round cornered profile. The profile of the slots/cut-out 41 may take other forms, but preferably uniquely correspond to the specific analytical technique or range of analytical techniques.

A sample plate holder 42 of a mass spectrometer (not shown) is configured to hold the sample plate 40 in an engaged position as shown in FIG. 4(*b*). To this end, the sample plate holder has engagement features, in this case provided by projections which form a 'key' 43, which are configured to engage with the engagement features of the sample plate 40 to allow the sample plate 40 to be held in the engaged position as shown in FIG. 4(*b*). To this end, the projections which form the key 43 are shaped to provide the exact negative of the cut-out 41 in the sample plate 40.

In this way, only a sample plate with matching engagement features will fit correctly into the sample plate holder 42. Thus, the sample plate holder 42 is configured to prevent a sample plate from being held in the engaged position unless the sample plate includes the cut-out 41.

A sample plate with engagement features that do not match the cut-out 41 (or with no engagement features) will not fit correctly into the sample plate holder 42. This preferably prevents operation of a mass spectrometer incorporating the sample plate holder 42, e.g. by stopping the door of the mass spectrometer from being closed or by the mass spectrometer detecting the incorrectly fitting sample plate.

Figure 5:
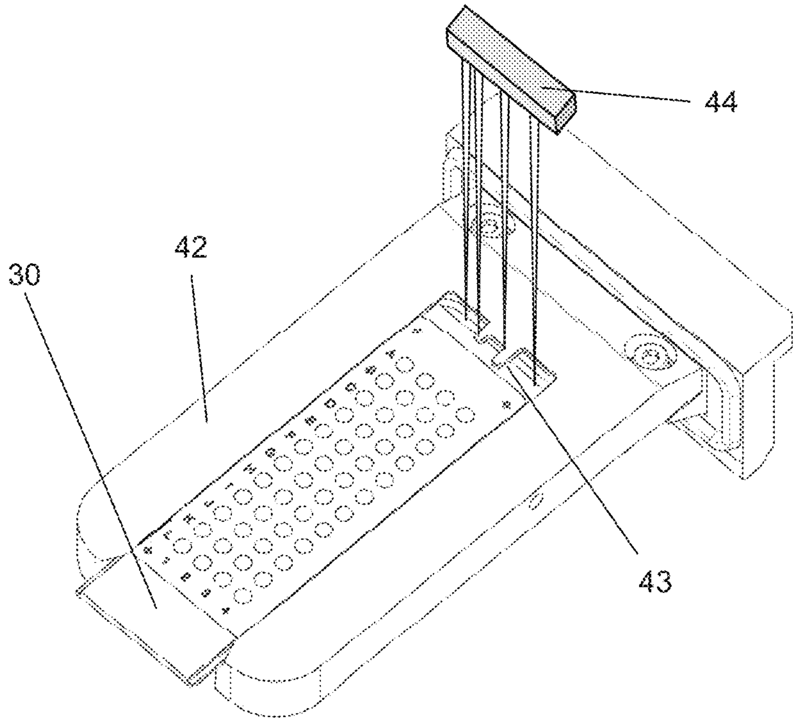
FIG. 5 shows a compact sample plate and the sample plate holder of FIG. 4(*b*), where the sample plate lacks the engagement features required to allow the sample plate to be held in the engaged position by the sample plate holder and such that the sample plate is left protruding from the sample plate holder by several millimetres.

For example, FIG. 5 shows how a compact sample plate 30 that lacks the engagement features of the sample plate 40 is prevented from being held in the engaged position by the key 43 on the sample plate holder 42. Here, the sample plate 30 is left protruding from the sample plate holder 42 by several millimetres. This may prevent the operation of the mass spectrometer because a door of the mass spectrometer cannot be closed whilst the sample plate 30 protrudes from the sample plate holder 42. Alternatively, operation of the mass spectrometer may be prevented in the scenario shown in FIG. 5 by configuring the mass spectrometer to operate only if it detects that the sample plate is being held in the engaged position (not the case in the scenario shown in FIG. 5), for example using an optical sensor 44.

This same optical sensor 44 could be used to detect whether a sample plate put in the mass spectrometer has the cut-out 41, with the mass spectrometer being configured to operate only if it determines, based on the output of the optical sensor 44, that the sample plate put in the mass spectrometer includes the cut-out 41. In this way, the mass spectrometer could be able to prevent use of sample plate 30 (which lacks the required cut-out 41), even if a user removed the key 43 of the mass spectrometer in an attempt to enable the sample plate 30 to be held in the engaged position by the sample plate holder. To do this, the sensor could be a multi-channel (or stacked single channel) reflective device that detects the shape of the engagement features on the sample plate by the correct combination of reflected and non-reflected light. Alternatively, the sensor can be an imaging device which images the engagement features and compares the features with a reference image. The imaging device could be the camera used to view the samples as held on the sample plates in the mass spectrometer.

Example 2

Figure 6A:
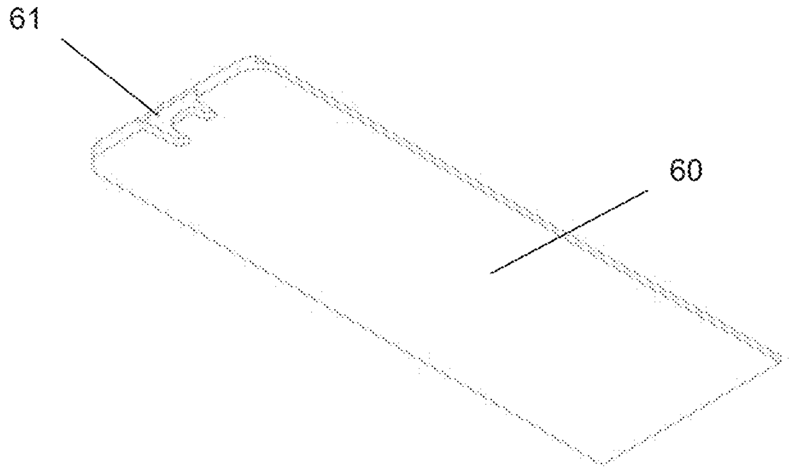
FIG. 6(*a*) shows the underside of a compact sample plate according to example 2.
Figure 6B:
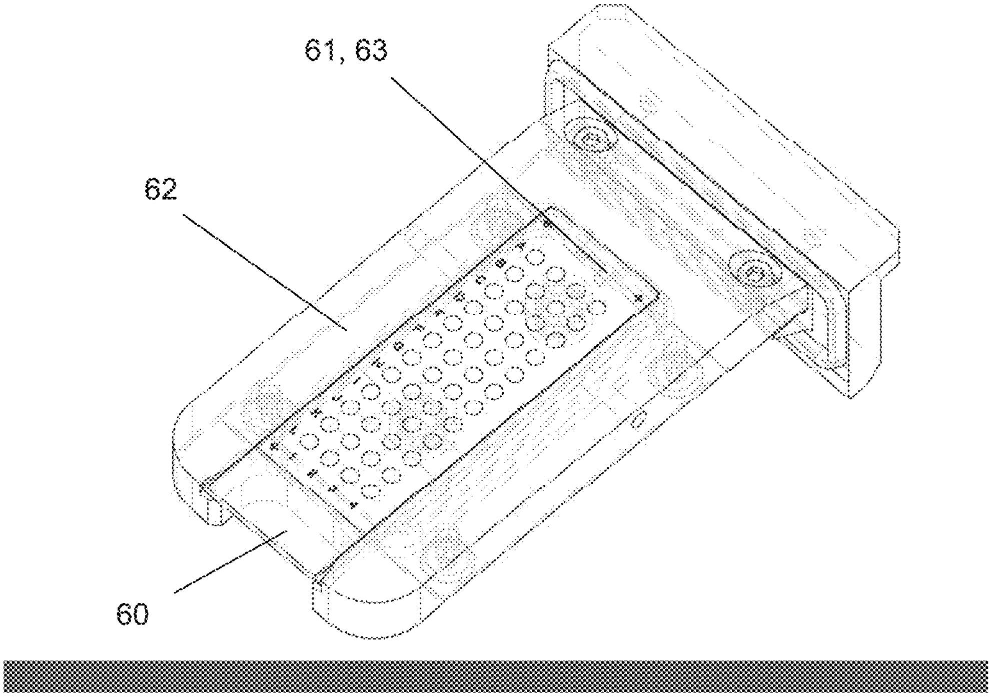

In this example, as shown in FIGS. 6(*a*) and 6(*b*), the sample plate 60 has a shaped recess 61 which extends partially into a back surface of the sample plate 60. The recess 61 can be formed of individual grooves or formed from a cut-out with a square cornered profile or a round cornered profile or the profile can have a different shape. This differs from example 1 in that the recess 61 extends only partially into the back surface of the sample plate 60.

The recess 61 is configured to limit use of the sample plate 60 to (and preferably uniquely correspond to) a specific analytical technique or range of analytical techniques, e.g. 'Analysis of intact microorganisms' or 'Analysis of lipids extracted from the cells of microorganisms' as described above.

Similar to example 1, a sample plate holder 62 has corresponding engagement features provided in this case by a projection 63 that is designed to be the negative of the recess 61 in the sample plate so that it can fit exactly.

If the sample plate has engagement features which do not match the engagement features of the sample plate holder, it will not fit properly into the sample plate holder such that incorrect operation of the mass spectrometer will be prevented.

Example 3

Figure 7A:
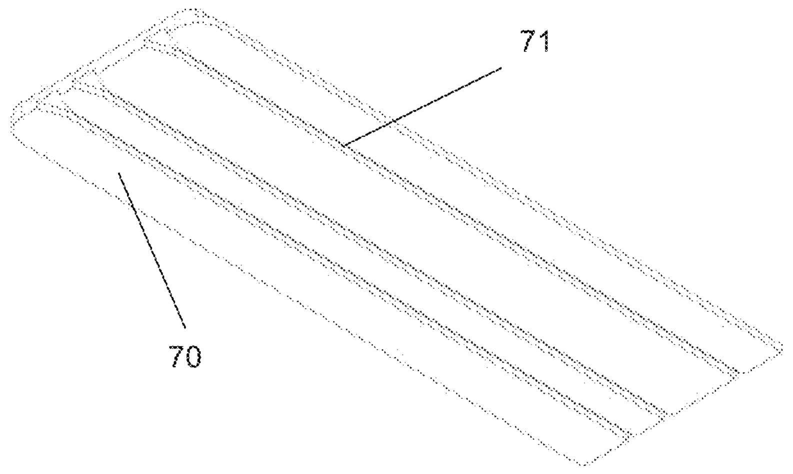
FIG. 7(*a*) shows the underside of a compact sample plate according to example 3.
Figure 7B:
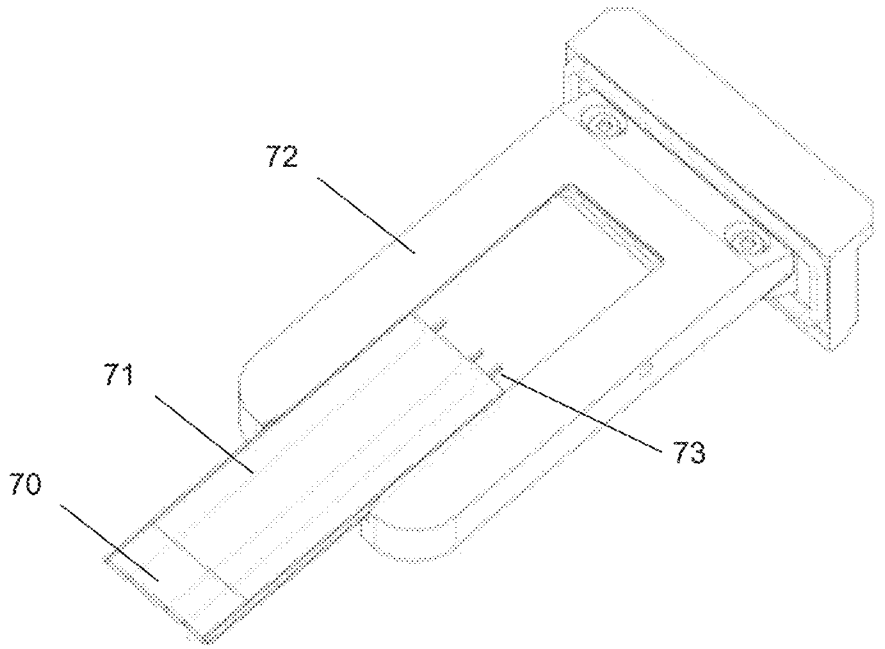

In this example, as shown in FIGS. 7(*a*) and 7(*b*), a sample plate 70 has engagement features provided by a number of slots 71 of a certain size and spacing in the back face of the sample plate 70 that run the full length of the sample plate 70.

The slots 71 are configured to limit use of the sample plate 70 to (and preferably uniquely correspond to) a specific analytical technique or range of analytical techniques, e.g. 'Analysis of intact microorganisms' or 'Analysis of lipids extracted from the cells of microorganisms' as described above.

Similar to example 1, a sample plate holder 72 has corresponding engagement features provided in this case by a corresponding array of pegs or dowels or ridges 73 which slide in the slots when the sample plate is inserted into the sample plate holder.

If the pattern of slots in a sample plate does not match the pattern of pegs or dowels or ridges in the sample plate holder 72, it will not be possible to insert the sample plate into the sample plate holder 72 and therefore into the mass spectrometer.

Although in this example the pegs or dowels or ridges are described as being part of the sample plate holder 72, they may in other examples be included in another part of the mass spectrometer, e.g. as part of a slot through which the sample plate needs to be pushed in order to go into the sample plate holder.

Example 4

Figure 8A:
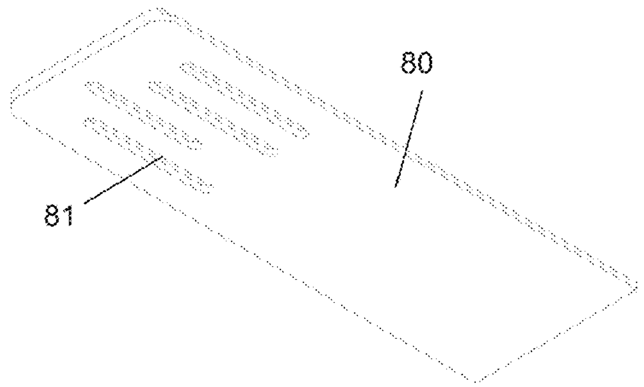
FIG. 8(*a*) shows a compact sample plate according to example 4.
Figure 8B:
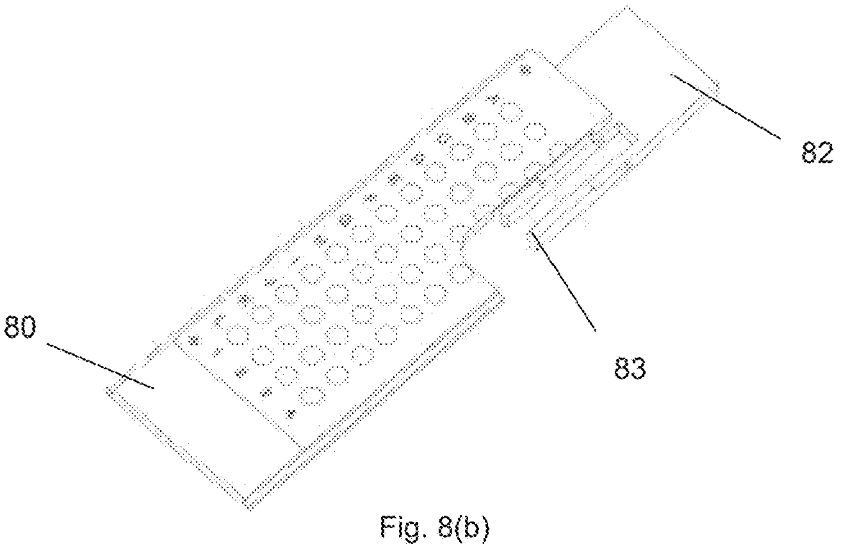
Figure 8C:
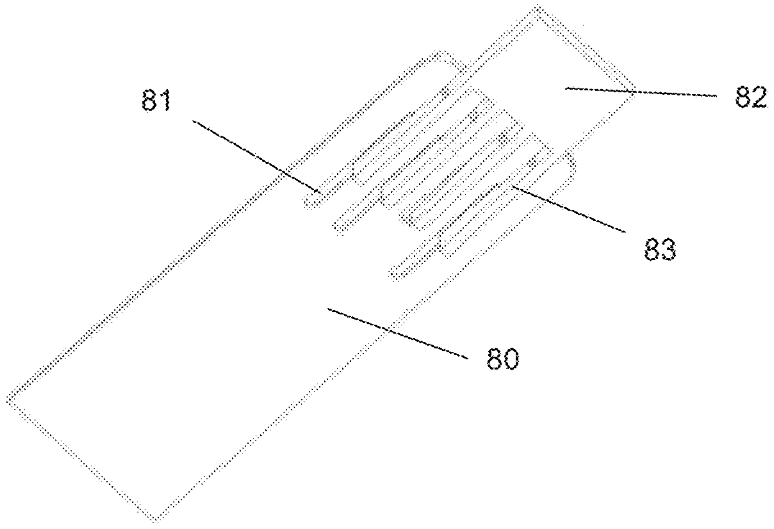

In this example, as shown in FIGS. 8(*a*), 8(*b*) and 8(*c*), a sample plate 80 has engagement features provided by a series of grooves 81 in a back face of the sample plate 80.

The grooves are configured to limit use of the sample plate 80 to (and preferably uniquely correspond to) a specific analytical technique or range of analytical techniques, e.g. 'Analysis of intact microorganisms' or 'Analysis of lipids extracted from the cells of microorganisms' as described above.

Similar to example 1, a sample plate holder (not shown) has corresponding engagement features provided in this case by projections in the form of pegs or dowels 83 on a hinged plate 82 fitted such that the hinged plate 82 will only tilt out of the way of the sample plate 80 if the engagement features of the sample plate and sample plate holder match, i.e. if the projections on the hinged plate 82 fit into the grooves 81 on the back face of the sample plate 80.

When a sample plate lacks the grooves 81 in the back face of the sample plate, the hinged plate 82 is configured to stop the sample plate from being fitted into the sample plate holder and it will not be possible to insert the sample plate correctly into the mass spectrometer.

Example 5

Figure 9A:
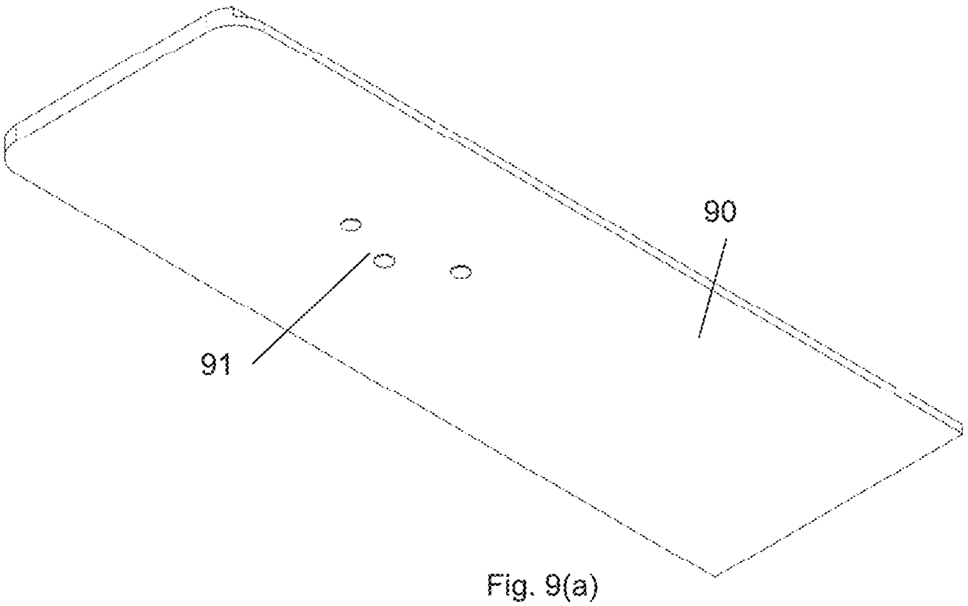
FIG. 9(*a*) shows the back of a compact sample plate according to example 5.
Figure 9B:
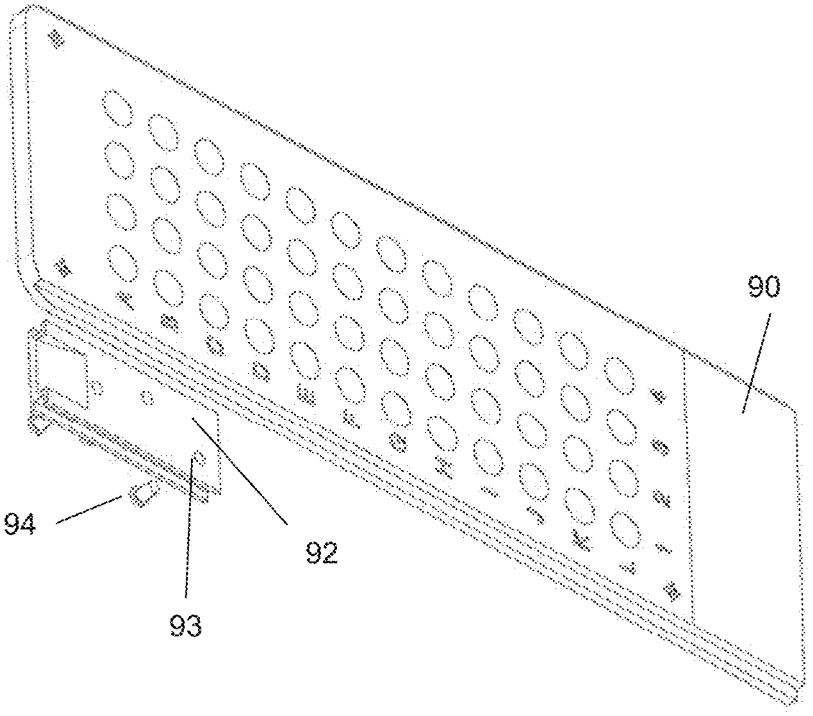

In this example, as shown in FIGS. 9(*a*) and 9(*b*), a sample plate 90 has engagement features in the form of small magnets or magnetic areas 91, each being respectively located in a specific position on or within the sample plate 90.

The magnets or magnetic areas 91 are configured to limit use of the sample plate 90 to (and preferably uniquely correspond to) a specific analytical technique or range of analytical techniques, e.g. 'Analysis of intact microorganisms' or 'Analysis of lipids extracted from the cells of microorganisms' as described above.

With reference to FIG. 9(*b*), a latch mechanism that includes a latch plate 92, which is itself included in a sample plate holder of a mass spectrometer (not shown), is configured to prevent the sample plate 90 from being held in the engaged position by the sample plate holder unless the sample plate 90 includes the magnets or magnetic areas located in the specific positions. Holes 93 in the latch plate carry magnets or magnetic areas 94 that correspond to the magnets or magnetic areas in the sample plate so that, provided the sample plate includes the magnets or magnetic areas located in the specific positions, the latch plate 92 attaches to the sample plate in a manner that permits the latch plate 92 to slide with the sample plate 90 in order to allow the sample plate to be held in the engaged position by the sample plate holder (e.g. by the latch plate sliding to the exact position required to 'unlock' the sample holder). Note if the sample plate 90 did not include any magnets or magnetic areas, then the latch plate 92 would preferably not attach to the sample plate 90 and would prevent the sample plate 90 from reaching the engaged position (e.g. by the latch plate not sliding to the exact position required to 'unlock' the sample holder). Note that if the sample plate 90 included one or more magnets or magnetic areas, but included them other than in the specific positions, then the latch plate 92 would preferably attach to the sample plate 90 in a manner that prevented the sample plate 90 from reaching the engaged position (e.g. by the latch plate sliding to a position other than the exact position required to 'unlock' the sample holder).

In this way only a sample plate 90 with the correctly located magnets or magnetic areas can be held in the engaged position by the sample plate holder.

The magnets or magnetic areas in example 5 could be used in combination with the other engagement features described in any of examples 1 to 4 above.

Example 6

Figure 10A:
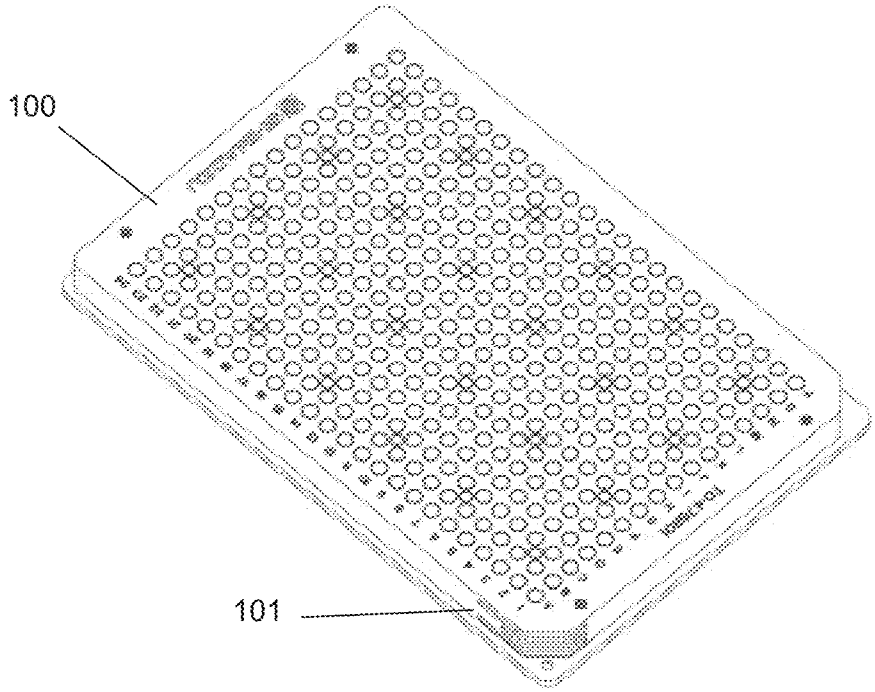
FIG. 10(*a*) shows a standard sample plate according to example 6.
Figure 10B:
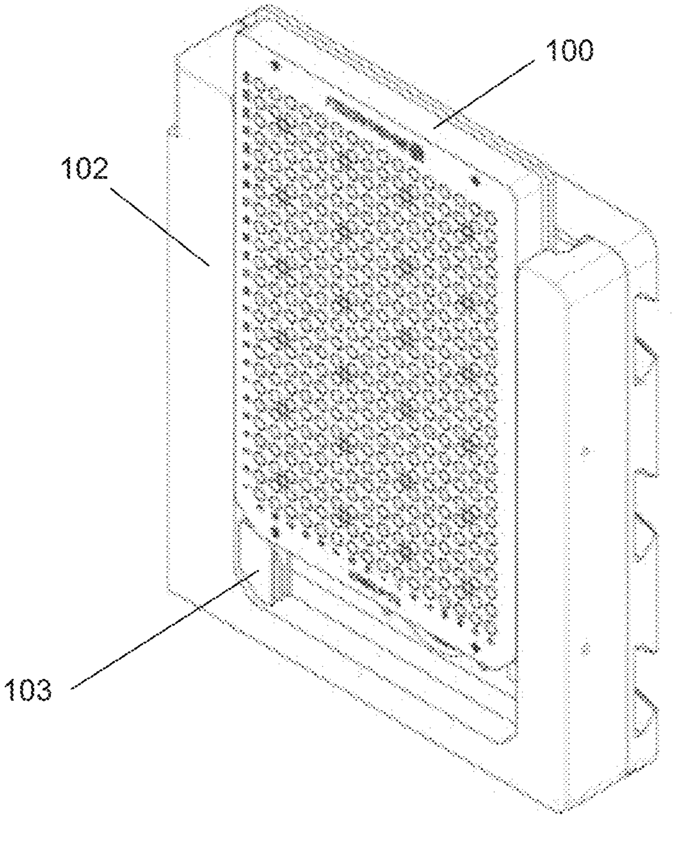

In this example, as shown in FIGS. 10(*a*) and 10(*b*) a sample plate 100 has engagement features provided by grooves 101 in the side of the sample plate 100.

In this example, the sample plate 100 has the form of a standard sample plate (except for the addition of grooves 101), rather than a compact sample plate (as was the case for examples 1-5 discussed above).

The grooves 101 are configured to limit use of the sample plate 100 to (and preferably uniquely correspond to) a specific analytical technique or range of analytical techniques, e.g. 'Analysis of intact microorganisms' or 'Analysis of lipids extracted from the cells of microorganisms' as described above.

Similar to example 1, a sample plate holder 102 has corresponding engagement features provided in this case by projections in the form of blades 103 which fit into the grooves 101 in the sample plate 100 when it is inserted into either the sample plate holder or sample stage.

If the grooves in the sample plate 101 correspond exactly with the blades 103 in the sample plate holder or sample stage, the sample plate can be held in an engaged position by the sample plate holder 102, though in FIG. 10(*b*) the sample plate is shown partially inserted so that the engagement features can be seen.

The sample plate 100 has the form of a modified standard micro-titer sample plate as used in a commercial MALDI mass spectrometer (Shimadzu MALDI-7090TH). This commercial instrument has a load lock where the sample plate is inserted into a cassette type sample plate holder. When the sample plate is to be analysed in the mass spectrometer, the cassette type sample plate holder (with sample plate) is transferred from the load-lock onto the sample stage. This mass spectrometer has a sensor in the load-lock to ensure that the sample plate is correctly inserted into the cassette type sample plate holder (for example to prevent the sample plate being inserted upside down).

Thus, if the Shimadzu MALDI-7090™ were modified to include the sample plate holder 102, then operation of the instrument would be prevented if a wrong sample plate (lacking the grooves 101) were inserted into the sample plate holder 102, since the blades 103 would prevent the wrong sample plate from being held in the engaged position by the sample plate holder 102, and the mass spectrometer would detect an incorrectly inserted sample plate.

Example 7

Figure 11:
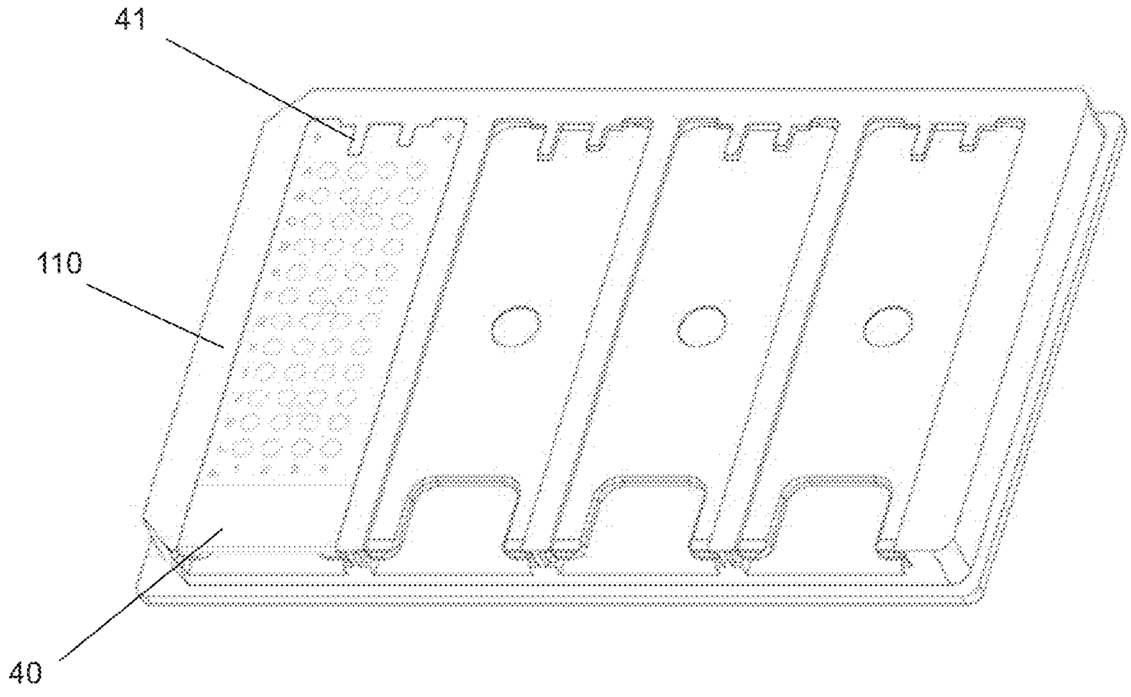
FIG. 11 shows a sample plate holder adaptor according to example 7, wherein the sample plate holder adaptor has the form of a standard sample plate as described in relation to FIG. 10(*a*), and is configured to hold four compact sample plates.
Figure 12:
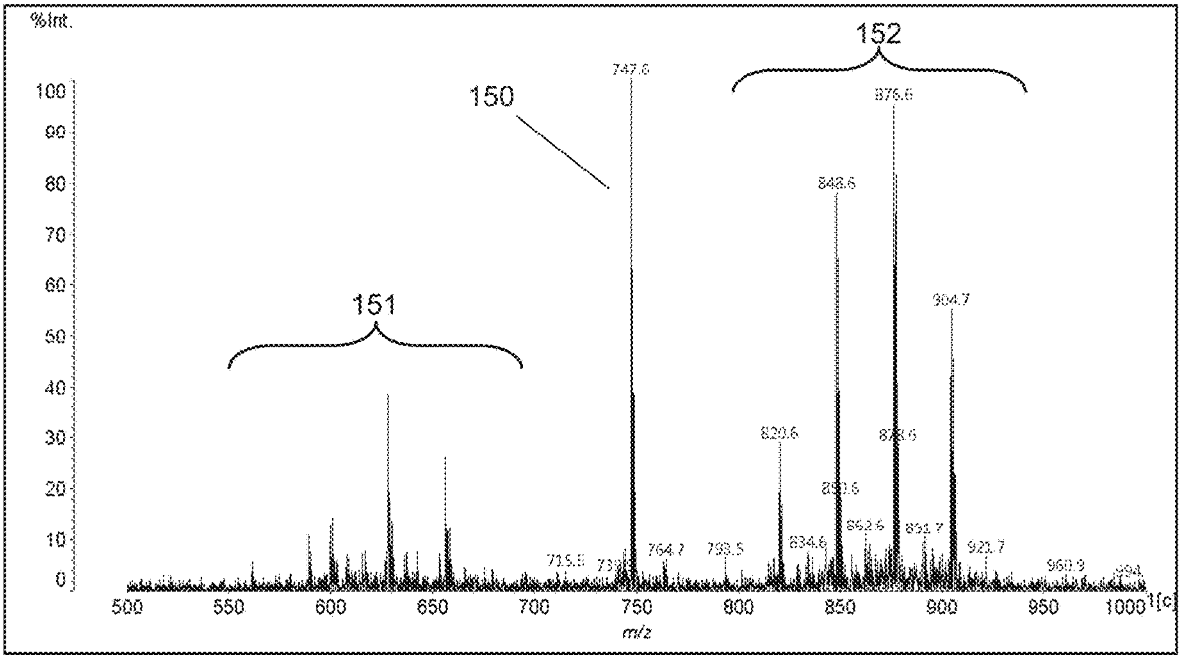
FIG. 12 shows a negative ion MALDI-TOF MS spectrum for a lipid sample where peaks from lipids in the coating on the sample plate are also present

In this example, as shown in FIG. 11, a sample plate holder adaptor 110 has the form of a standard sample plate as described in relation to FIG. 10(*a*) (including the grooves 111), and is therefore configured to be held by a sample plate holder of a typical standard floor standing mass spectrometer (lacking any special modifications or engagement features as described herein).

The sample plate holder adaptor 110 is configured to hold four compact sample plates 40 as described in relation to example 1.

The sample plate holder adaptor 110 includes, for each of the sample plates it is configured to hold, engagement features in the form of a projections which form a 'key' 41, which are configured to engage with the engagement features of the sample plate 40 to allow the sample plate 40 to be held in an engaged position as shown in FIG. 11.

Thus, in this example, the sample plate holder adaptor 110 plays the role of the sample plate holder 42 described in connection with example 1.

In this way, a commercial MALDI mass spectrometer (e.g. Shimadzu MALDI-7090™—described above) can be retrofitted, though use of the sample plate holder adaptor 110, to prevent a sample plate from being held in the engaged position by the sample plate holder adaptor 110 unless the sample plate includes one or more engagement features configured to limit use of the sample plate to a specific analytical technique or a range of analytical techniques to be performed using the mass spectrometer. This may help to "lock down" the mass spectrometer for use only with sample plates 40 configured for use in a specific analytical technique or range of analytical techniques to be performed using the mass spectrometer, without needing to modify the original sample plate holder of the instrument.

In a possible modification of example 7 (not illustrated), the sample plate holder adaptor 110 of FIG. 11 could be modified to use other forms of engagement features, e.g. such as those described with reference to examples 2-5.

In another possible modification of example 7 (not illustrated), the sample plate holder adaptor 110 of FIG. 11 could be modified to include the grooves 101 described with reference to example 6, in order to permit use with the sample plate holder 102 described with reference to example 6.

FINAL REMARKS

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

A number of publications are cited above in order to more fully describe and disclose the invention and the state of the art to which the invention pertains. Full citations for these references are provided below. The entirety of each of these references is incorporated herein.

[1] DE19754978C

[2] U.S. Pat. No. 6,287,872B

[3] EP2792471 B1

[4] US2017029587A1

[5] GB2524854B

[6] EP3055420B1

[7] Kaleta and Wolk, Clin Lab News; May 2012

The invention claimed is:

1. A mass spectrometry apparatus, including:

a mass spectrometer including:

a sample plate holder configured to hold a sample plate in an engaged position;

wherein the mass spectrometer is configured to perform a mass spectrometric analysis of a sample only when the sample is located on a sample plate that is held in the engaged position by the sample plate holder;

the sample plate configured for use in the specific analytical technique or range of analytical techniques to be performed using the mass spectrometer, wherein the sample plate includes the one or more first engagement features in the form of multiple slots which extend by different amounts into an end of the sample plate which is configured to be inserted into the sample plate holder, thereby providing a shaped cut-out in said end of the sample plate configured to limit use of the sample plate to the specific analytical technique or range of analytical techniques wherein the shaped cut-out uniquely corresponds to the specific analytical technique or range of analytical techniques;

wherein the sample plate holder includes one or more second engagement features in the form of projections which form a key which is configured to engage with the shaped cut-out in said end of the sample plate so as to allow the sample plate having the shaped cut-out to be held in the engaged position by the sample plate holder and to prevent another sample plate from being held in the engaged position by the sample plate holder unless that other sample plate includes the shaped cut-out.

2. The mass spectrometry apparatus according to claim 1, wherein the mass spectrometer is configured for use only in the specific analytical technique or range of analytical techniques.

3. The mass spectrometry apparatus according to claim 1, wherein the shaped cut-out included in the sample plate extend partially into a rear face of the sample plate, wherein the rear face of the sample plate is on an opposite side of the sample plate from a front face of the sample plate, wherein the front face of the sample plate is configured to have a sample located thereon when the sample plate is in use.

4. The mass spectrometry apparatus according to claim 1, wherein the mass spectrometer is configured to perform a mass spectrometric analysis of a sample only when the sample is located on a sample plate that is held in the engaged position by the sample plate holder by:

the mass spectrometer having a slot into which the sample plate needs to be fully inserted in order to be held in the engaged position by the sample plate holder;

the one or more second engagement features of the mass spectrometer being configured to prevent the sample plate from being inserted fully into the mass spectrometer unless the sample plate includes the shaped cut-out;

the mass spectrometer being configured to perform a mass spectrometric analysis of a sample only when a door of the mass spectrometer is closed, wherein the door is configured not to close if a sample plate is only partially, and not fully, inserted into the slot.

5. The mass spectrometry apparatus according to claim 1, wherein the mass spectrometer is configured to perform a mass spectrometric analysis of a sample only when the sample is located on a sample plate that is held in the engaged position by the sample plate holder by:

the mass spectrometer having a sample plate position sensor configured to used to detect if a sample plate is held in the engaged position by the sample plate holder;

wherein the mass spectrometer is configured to perform a mass spectrometric analysis of a sample only when the mass spectrometer determines, based on an output of the sample plate position sensor, that a sample plate is held in the engaged position by the sample plate holder.

6. The mass spectrometry apparatus according to claim 1, wherein the mass spectrometer has an engagement feature sensor configured to be used to detect whether a sample plate put in the mass spectrometer has the shaped cut-out, wherein the mass spectrometer is configured to perform a mass spectrometric analysis of a sample only when the mass spectrometer determines, based on an output of the engagement feature sensor, that the sample plate put in the mass spectrometer includes the shaped cut-out.

7. The mass spectrometry apparatus according to claim 1, wherein the mass spectrometer is a MALDI TOF mass spectrometer.

8. The mass spectrometry apparatus according to claim 7, wherein:

the specific analytical technique or range of analytical techniques is analysis of intact microorganisms, in which bacteria cultured on an Agar gel are applied intact onto the sample plate, and mass spectra produced by the mass spectrometer are used for identification of microorganisms by comparing the mass spectra with databases containing mass spectra of peptides and proteins extracted from microorganisms of interest;

wherein the sample plate configured for use in analysis of intact microorganisms has a lipid coating applied to a front face of the sample plate, wherein the front face of the sample plate is configured to have a sample located thereon when the sample plate is in use.

9. The mass spectrometry apparatus according to claim 7, wherein:

the specific analytical technique or range of analytical techniques is analysis of lipids extracted from cells of microorganisms, in which bacteria cultured on an Agar gel are processed to extract characteristic lipids from the cells of the bacteria which are then applied to the sample plate, and mass spectra produced by the mass spectrometer are used for identification of microorganisms by comparing the mass spectra with databases containing mass spectra of lipids extracted from microorganisms of interest;

wherein the sample plate configured for use in analysis of lipids extracted from the cells of microorganisms does not have a lipid coating applied to a front face of the sample plate, wherein the front face of the sample plate is configured to have a sample located thereon when the sample plate is in use.

10. The mass spectrometry apparatus according to claim 1, wherein the mass spectrometry apparatus includes one or more sample plates configured for use in different specific analytical technique or range of analytical techniques to be performed by a mass spectrometer, wherein each sample plate configured for use in the different specific analytical technique or range of analytical techniques includes one or more third engagement features, which are different to the first engagement features, and which uniquely correspond to the other different analytical technique or range of analytical techniques configured to limit use of the sample plate to the different analytical technique or range of analytical techniques.

11. The mass spectrometry apparatus according to claim 1, wherein the sample plate has a coating applied to a front face of the sample plate, wherein the coating is configured for use in the specific analytical technique or range of analytical techniques, wherein the front face of the sample plate is configured to have a sample located thereon when the sample plate is in use.

* * * * *